United States Patent
Rydhed et al.

(10) Patent No.: US 12,528,393 B2
(45) Date of Patent: Jan. 20, 2026

(54) SEAT ASSEMBLY FOR A VEHICLE, VEHICLE AND METHODS

(71) Applicant: Volvo Car Corporation, Gothenburg (SE)

(72) Inventors: Patrik Rydhed, Gothenburg (SE); Emma Martensson, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 175 days.

(21) Appl. No.: 18/239,801

(22) Filed: Sep. 18, 2023

(65) Prior Publication Data

US 2024/0149761 A1 May 9, 2024

(30) Foreign Application Priority Data

Oct. 4, 2022 (EP) ..................................... 22199555

(51) Int. Cl.
| | |
|---|---|
| *B60N 2/26* | (2006.01) |
| *B60N 2/30* | (2006.01) |
| *B60N 2/32* | (2006.01) |

(52) U.S. Cl.
CPC ................. *B60N 2/32* (2013.01); *B60N 2/26* (2013.01); *B60N 2/3084* (2013.01); *B60N 2/3086* (2013.01)

(58) Field of Classification Search
CPC ...... B60N 2/3084; B60N 2/3086; B60N 2/26; B60N 2/32

(Continued)

(56) References Cited

U.S. PATENT DOCUMENTS

| 4,768,827 A | 9/1988 | Musgrove | |
|---|---|---|---|
| 5,524,962 A * | 6/1996 | Fulgenzi | .............. B60N 2/3081 |
| | | | 297/238 |

(Continued)

FOREIGN PATENT DOCUMENTS

| EP | 2626235 A1 * | 8/2013 | ........... B60N 2/3084 |
|---|---|---|---|
| FR | 2707567 A1 | 1/1995 | |

(Continued)

OTHER PUBLICATIONS

Mar. 29, 2023 European Search Report issued in corresponding EP Application No. 22199555.

(Continued)

*Primary Examiner* — Rodney B White
(74) *Attorney, Agent, or Firm* — Clements Bernard Walker; Christopher L. Bernard

(57) ABSTRACT

A seat assembly for a vehicle includes a back rest part having a primary back rest surface being configured to support a back of an adult sitting and a sitting module. The sitting module includes a first part and a second part, wherein the first part carries a primary functional surface and a secondary back rest surface being configured to support a back of a child. The sitting module includes a pivoting mechanism and a sliding mechanism. The pivoting mechanism is kinematically interposed between the first part and the second part and the sliding mechanism is kinematically interposed between the first part and the back rest part such that the seat assembly may selectively assume a primary state in which the primary functional surface is operational or a secondary state in which the seat assembly is configured to receive a child.

15 Claims, 5 Drawing Sheets

(58) Field of Classification Search
USPC .................................................. 297/238, 255
See application file for complete search history.

(56) References Cited

U.S. PATENT DOCUMENTS

| | | | | | |
|---|---|---|---|---|---|
| 5,542,742 | A * | 8/1996 | Fulgenzi | .............. | B60N 2/3086 297/238 |
| 7,159,941 | B2 * | 1/2007 | Thomas | ............... | B60N 2/2863 297/238 |
| 7,980,630 | B2 * | 7/2011 | Pos | ...................... | B60N 2/2863 297/250.1 |
| 8,251,445 | B2 * | 8/2012 | Pos | ...................... | B60N 2/3084 297/250.1 |
| 8,393,677 | B2 * | 3/2013 | Wieclawski | ......... | B60N 2/3059 297/236 X |
| 8,544,950 | B2 * | 10/2013 | Merensky | ............ | B60N 2/3084 297/238 X |
| 8,840,181 | B2 * | 9/2014 | Pos | ........................ | B60N 2/879 297/250.1 |
| 10,604,038 | B2 * | 3/2020 | Li | ............................ | B60N 2/28 |
| 10,793,031 | B1 * | 10/2020 | Daniels | ................ | B60N 2/2812 |
| 10,933,777 | B2 * | 3/2021 | Mizuno | .................... | B60N 2/32 |
| 2007/0170758 | A1 * | 7/2007 | Allen | .................... | B60N 2/2872 297/250.1 |
| 2013/0140863 | A1 * | 6/2013 | Wieclawski | ......... | B60N 2/3086 297/236 |
| 2019/0160979 | A1 * | 5/2019 | Maresky | .............. | B60N 2/3086 |

FOREIGN PATENT DOCUMENTS

| | | | | | |
|---|---|---|---|---|---|
| FR | 2728840 | A1 * | 7/1996 | ........... | B60N 2/3084 |
| GB | 2423244 | A * | 8/2006 | ........... | B60N 2/3086 |
| GB | 2436283 | A | 9/2007 | | |
| GB | 2439521 | A * | 1/2008 | ............... | B60N 2/26 |
| WO | WO-0105618 | A1 * | 1/2001 | ............... | B60N 2/26 |
| WO | WO-2013024959 | A1 * | 2/2013 | ........... | B60N 2/3084 |

OTHER PUBLICATIONS

Office action issued Apr. 16, 2024 in the corresponging application EP 22 199 555.8.

* cited by examiner

SEAT ASSEMBLY FOR A VEHICLE, VEHICLE AND METHODS

CROSS-REFERENCE TO RELATED APPLICATION

The present disclosure claims the benefit of priority of co-pending European Patent Application No. 22 199 555.8, filed on Oct. 4, 2022, and entitled "SEAT ASSEMBLY FOR A VEHICLE, VEHICLE AND METHODS," the contents of which are incorporated in full by reference herein.

TECHNICAL FIELD

The present disclosure relates to a seat assembly for a vehicle. Moreover, the present disclosure is directed to a vehicle including a driver front seat, a passenger front seat and such a seat assembly. Additionally, the present disclosure relates to a method for transferring a seat assembly for a vehicle from a primary state in which a primary functional surface of the seat assembly is operational into a secondary state in which the seat assembly is configured to receive a child. Furthermore, the present disclosure is directed to a method for transferring a seat assembly for a vehicle from a secondary state in which the seat assembly is configured to receive a child into a primary state in which a primary functional surface of the seat assembly is operational.

BACKGROUND

Seat assemblies which can assume different states in order to provide different functionalities are known in the art. Such seat assemblies may be called multifunctional.

Examples of such seat assemblies can be selectively transferred between a state in which the seat assembly can be used by an adult and a state in which the seat assembly can be used by a child. This is especially convenient in cases in which such a seat assembly is provided in a rental car. Then, the user of the rental car does not need to bring an appropriate child seat if he or she is traveling together with the child. On the other hand, if the rental car is used by adults only, the space inside the rental car is not limited by unused child seats which are provided for other users potentially traveling with children.

SUMMARY

It is an objective of the present disclosure to further improve such multifunctional seat assemblies. Especially, the seat assemblies shall be safe and easy to use in each of the states that can be assumed by the seat assembly.

According to a first aspect, there is provided a seat assembly for a vehicle. The seat assembly includes a back rest part having a primary back rest surface being configured to support a back of an adult sitting on the seat assembly and a sitting module including a first part and a second part. The first part carries a primary functional surface and a secondary back rest surface being configured to support a back of a child sitting on the seat assembly. The primary functional surface and the secondary back rest surface are arranged on opposite sides of the first part. The sitting module includes a pivoting mechanism and a sliding mechanism. The pivoting mechanism is kinematically interposed between the first part and the second part and the sliding mechanism is kinematically interposed between the first part and the back rest part such that the seat assembly may selectively assume a primary state in which the primary functional surface is operational or a secondary state in which the seat assembly is configured to receive a child. In the present context, the seat assembly is configured to be used by an adult in the primary state. All components being designated with the term primary are, thus, configured to provide a functionality for an adult. In contrast thereto, the seat assembly is configured to be used by a child in the secondary state. All components being designated with the term secondary are, thus, configured to provide a functionality for a child. Consequently, in the primary state and the secondary state, the seat assembly provides two different functionalities. Since the primary state and the secondary state may be selectively assumed, the seat assembly may be transferred from the primary state into the secondary state and from the secondary state into the primary state as needed. Due to the fact that the seat assembly includes both the pivoting mechanism and a sliding mechanism, the components of the seat assembly can be adjusted to be in a safe and comfortable position both in the primary state and in the secondary state. As compared to known solutions, a comparatively large space, especially a comparatively large leg space, may be provided for the child if the seat assembly is in the secondary state.

It is noted that the primary back rest surface which is configured to support a back of an adult, is at least configured to perform this functionality with respect to its size and shape.

Analogously, the secondary back rest surface which is configured to support a back of a child, is at least configured to perform this functionality with respect to its size and shape.

Since the seat assembly according to the present disclosure is configured to be used in a vehicle, it may also be called a vehicle seat assembly.

In an example, the sliding mechanism may include a rail and a block-shaped element being guided in the rail. It is also possible to use a known sliding mechanism which is used for the longitudinal adjustment of a position of a front seat.

In another example, the pivoting mechanism includes a pivot axis which extends through corresponding openings of the parts to be pivoted. Alternatively, one of the parts to be pivoted includes an opening and the other part to be pivoted includes a protrusion which extends into the opening.

According to an example, the seat assembly includes a primary seatbelt arrangement which is configured to secure an adult to the seat assembly. The primary seatbelt arrangement may include a three-point seatbelt.

According to a further example, the seat assembly includes a secondary seatbelt arrangement which is configured to secure a child to the seat assembly. The secondary seatbelt arrangement may include a five-point seatbelt.

In an example, the primary functional surface is a primary sitting surface being configured to support a bottom and a portion of the legs of an adult sitting on the seat assembly. Alternatively, the primary functional surface is a support surface for supporting objects. Further alternatively, the primary functional surface is an arm rest surface being configured to support an arm of an adult. In this alternative, the arm rest surface is configured to support an arm of an adult sitting next to the seat assembly according to the present disclosure. Thus, a wide variety of functionalities can be provided for an adult using the seat assembly.

In an example, the secondary back rest surface faces the second part in the primary state. Consequently, the seat assembly may assume a compact configuration. Additionally or alternatively, an end portion of the first part is arranged adjacent to a blocking surface of the back rest part in the primary state. This has the effect that the pivoting mechanism is blocked. In other words, the end portion of the first part is arranged under the back rest part. Thus, the pivoting mechanism cannot move in an undesired manner. Moreover, in such a configuration, the first part can be comparatively long. Consequently, also the secondary back rest surface can be comparatively long. This has the advantage that also older children are able to sit comfortably and safely on the seat assembly if it is in the secondary state.

In an example, the secondary back rest surface at least partially faces the primary back rest surface in the secondary state. Consequently, a child that is using the seat assembly is oriented rearwards. This is a particularly safe manner for transporting children in vehicles.

In an example, a secondary sitting surface being configured to support a bottom and a portion of the legs of the child sitting on the seat assembly is located on the second part. Thus, a child using the seat assembly is sitting on a comparatively low level. In other words, the child is sitting close to a vehicle structure on which the seat assembly is arranged.

In an example, the second part includes a first portion and a second portion, wherein one of the first portion and the second portion carries the secondary sitting surface. Moreover, the first portion and the second portion are pivotably connected. Thus, an orientation of the secondary sitting surface can be adapted by pivoting the first portion with respect to the second portion. Consequently, the secondary sitting surface can be adapted to a child's needs. This enhances comfort and safety.

In an example, a secondary sitting surface being configured to support a bottom and a portion of the legs of the child sitting on the seat assembly is located on a third part, the third part being pivotably supported on the first part. Also in this example, an orientation of the secondary sitting surface can be adjusted by pivoting the third part with respect to the first part. Consequently, the secondary sitting surface can be adapted to a child's needs. This enhances comfort and safety.

In an example, the first part includes a first portion and a second portion. The first portion and the second portion are translationally movable with respect to one another. The translatory movement may be guided by a guiding means, for example a guiding rail. Since the first part carries the secondary back rest surface, a length of the secondary back rest surface can be adjusted by translatory removing the first portion and the second portion relative to each other. Consequently, also the secondary back rest surface can be adapted to a child's needs. This enhances comfort and safety.

In an example, one of the first portion and the second portion is kinematically connected to the second part via the pivoting mechanism and another of the first portion and the second portion carries a secondary head rest surface for supporting a head of the child sitting on the seat assembly. In other words, an adjustable headrest is provided for the child. The head rest surface may be shaped concavely. Thus, a child's head may be supported in a safe and comfortable manner.

In an example, the seat assembly is a rear bench seat assembly with three sitting zones. The three sitting zones are arranged side by side along a width direction of the rear bench seat assembly. Each of the three sitting zones is configured to receive an adult sitting on the rear bench assembly. The sitting module and the primary sitting surface are associated with one of the sitting zones being arranged between the two remaining sitting zones. In other words, the sitting module and the primary sitting surface are associated with a middle seat of the rear bench seat assembly. Thus, the middle seat can be in a primary state or in a secondary state as defined above.

In an example, at least one of the pivoting mechanism and the sliding mechanism includes a respective drive means. This means that at least one of the pivoting mechanism and the sliding mechanism may be at least partly driven in an automatic manner. This means that the seat assembly can be transferred between the primary state and the secondary state at least in a partially automatic manner. This is comfortable for a user of the seat assembly.

In an example, the drive means for the pivoting mechanism includes at least one electric motor and a gear drive.

In another example, the drive means for the sliding mechanism includes at least one electric motor and a rack and pinion mechanism being drivingly connected thereto.

In an example, at least one of the pivoting mechanism and the sliding mechanism includes a position holding means being configured to lock the pivoting mechanism or the sliding mechanism in a desired position. Consequently, at least one of the pivoting mechanism and the sliding mechanism can be securely held in the desired relative position of the parts being connected by means of the pivoting mechanism or the sliding mechanism respectively. Consequently, in each of the primary state of the secondary state, the seat assembly can assume a configuration that is both comfortable and safe for a given adult or for a given child.

In an example, the position holding means may include a pair of toothings which are configured to engage each other in different relative positions. Alternatively, a number of holes may be provided on one of the movable parts and a pin being configured to engage one of the holes may be provided on the other one of the movable parts. The holes may be arranged in a regular pattern.

According to a second aspect, there is provided a vehicle including a driver front seat, a passenger front seat and a seat assembly according to the present disclosure. A gap is provided between the driver front seat and the passenger front seat. Moreover, the first part of the seat assembly at least partially extends into the gap if the seat assembly is in the secondary state. Alternatively, a width of the gap is larger than a width of the first part and the first part is arranged adjacent to the gap when the seat assembly is in the secondary state. Thus, the first part may use the space between the driver front seat and the passenger front seat when the seat assembly is in the secondary state. Consequently, the seat assembly provides a comparatively big space for a child sitting thereon. Thus, the child may sit in a very comfortable manner. In case of an accident, especially a rear-end collision, the front driver seat and the front passenger seat may be moved. However, such a movement will not reduce the space for a child sitting in a seat assembly which assumes the secondary state. In case of an accident, the front driver seat and the front passenger seat will move backwards without interfering with the first part of the seat assembly. Thus, the child is very safe. The same applies in the second alternative, wherein the first part is arranged adjacent to the gap such that in case of an accident, the first part can move into the gap between the front driver seat and the front passenger seat.

According to a third aspect, there is provided a method for transferring a seat assembly for a vehicle from a primary state in which a primary functional surface of the seat assembly is operational, into a secondary state in which the seat assembly is configured to receive a child. The seat assembly includes a back rest part having a primary back rest surface being configured to support a back of an adult sitting on the seat assembly and a sitting module including a first part and a second part, wherein the first part carries the primary functional surface and a secondary back rest surface being configured to support a back of a child sitting on the seat assembly. The primary functional surface and the secondary back rest surface are arranged on opposite sides of the first part. The method includes: translationally moving at least the first part away from the back rest part, and pivoting the first part with respect to the second part such that the primary back rest surface and the secondary back rest surface face each other.

Thus, the seat assembly may be transferred from the primary state into the secondary state in a very simple manner. The transformation of the a seat assembly being configured to receive an adult into a seat assembly being configured to receive a child is, thus, quick and easy.

It is noted that the method for transferring a seat assembly for a vehicle from a primary state into a secondary state may be carried out using the seat assembly according to the present disclosure.

According to a fourth aspect, there is provided a method for transferring a seat assembly for a vehicle from a secondary state in which the seat assembly is configured to receive a child, into a primary state in which a primary functional surface of the seat assembly is operational. The seat assembly includes a back rest part having a primary back rest surface being configured to support a back of an adult sitting on the seat assembly and a sitting module including a first part and a second part. The first part carries the primary functional surface and a secondary back rest surface being configured to support a back of a child sitting on the seat assembly. The primary functional surface and the secondary back rest surface are arranged on opposite sides of the first part. The method includes: pivoting the first part with respect to the second part such that the secondary back rest surface faces the second part, and translationally moving at least the first part towards the back rest part.

Thus, the seat assembly may be transferred from the secondary state into the primary state in a very simple manner. The transformation of the seat assembly being configured to receive a child into a seat assembly being configured to receive an adult is, thus, quick and easy.

It is noted that the method for transferring a seat assembly for a vehicle from a secondary state into a primary state may be carried out using the seat assembly according to the present disclosure.

It should be noted that the above examples may be combined with each other irrespective of the aspect involved.

These and other aspects of the present disclosure will become apparent from and elucidated with reference to the examples described hereinafter.

BRIEF DESCRIPTION OF THE DRAWINGS

Examples of the disclosure will be described in the following with reference to the following drawings.

The figures are merely schematic representations and serve only to illustrate examples of the disclosure. Identical or equivalent elements are in principle provided with the same reference signs.

DETAILED DESCRIPTION

Figure 1:
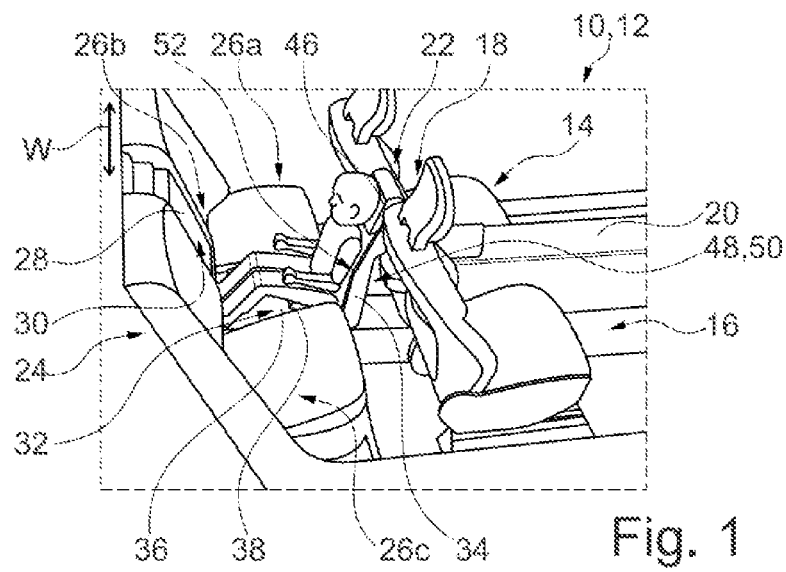
FIG. 1 shows an interior of a vehicle according to the present disclosure including a seat assembly according to the present disclosure which can be transferred from a primary state into a secondary state and vice versa using methods according to the present disclosure, wherein the seat assembly is in a secondary state, FIG. 2a schematically shows the seat assembly of FIG. 1 in a stage while the seat assembly is transferred into a primary state, FIG. 2b schematically shows the seat assembly of FIG. 1 in a different stage while the seat assembly is transferred into a primary state.

FIG. 1 shows an interior 10 of a vehicle 12. The vehicle 12 includes a driver front seat 14 and a passenger front seat 16. The driver front seat 14 and the passenger front seat 16 are located in a first row of seats in the vehicle 12. Between the driver front seat 14 and the passenger front seat 16, there is a gap 18. A lower portion of the gap 18 is occupied by a center storage compartment 20 or center console. Above the center storage compartment 20, there is a free space 22.

The vehicle 12 also includes a seat assembly 24. The seat assembly 24 is also arranged in the interior 10 of the vehicle 12. In the present example, the seat assembly 24 is a rear bench seat assembly. It is arranged in a second row of seats in the interior 10 of the vehicle 12. The seat assembly 24 includes three sitting zones 26a, 26b, 26c being arranged side-by-side along a width direction W of the rear bench seat assembly.

In the configuration shown in FIG. 1, the sitting zones 26a and 26c are configured to receive an adult sitting on the seat assembly 24, i.e. on the rear bench assembly. The middle seat, i.e. the sitting zone 26b being arranged between the two remaining sitting zones 26a, 26c is configured to receive a child. In this configuration, a portion of the back rest for the child extends into the free space 22. However, the middle seat or the sitting zone 26b may be reconfigured such that it is configured to receive an adult sitting on sitting zone 26b.

Figure 2:
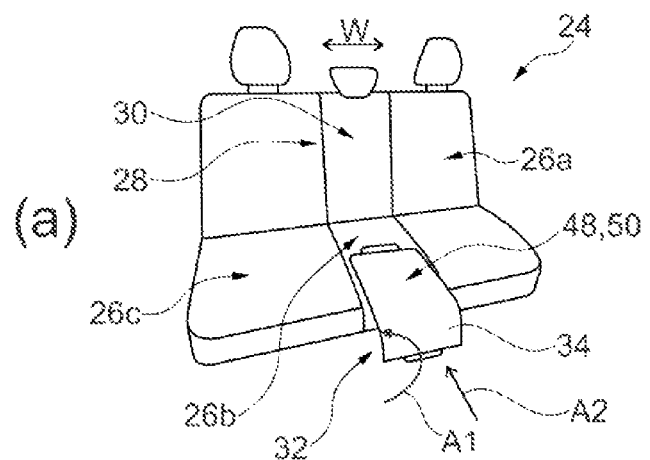
Figure 2:
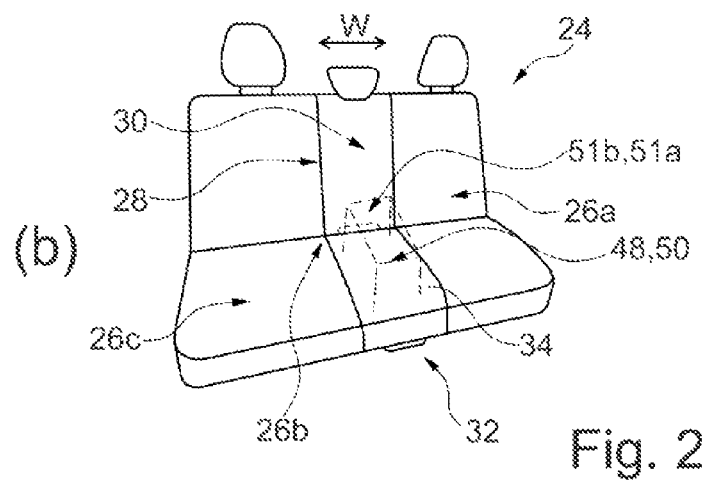

This reconfiguration is illustrated in FIG. 2. First, the back rest of the child's needs to be folded down. This is illustrated by arrow A1 (cf. FIG. 2(a)).

Thereafter, the module including the back rest for the child is slidably moved towards the back rest of the rear bench assembly, i.e. the back rest for the adult. This is illustrated by arrow A2. Consequently, the seat assembly 24 is in a configuration in which it may receive three adults, one on each sitting zone 26a, 26b, 26c.

In the following, a state of the seat assembly 24 in which the sitting zone 26b is configured to receive an adult will be designated as a primary state. A state of the seat assembly 24 in which the sitting zone 26b is configured to receive a child will be designated as a secondary state.

Figure 3:
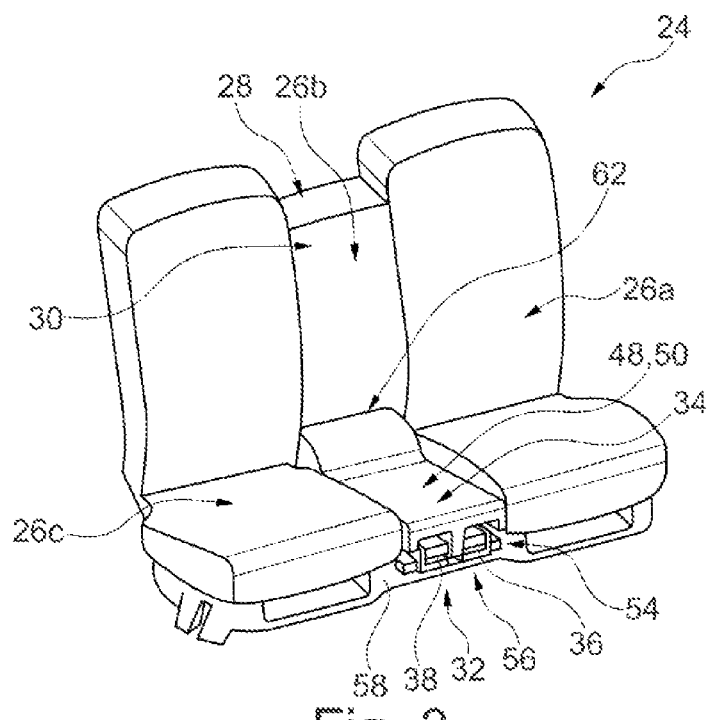
FIG. 3 shows the seat assembly of FIGS. 1 and 2 in the primary state.
Figure 4:
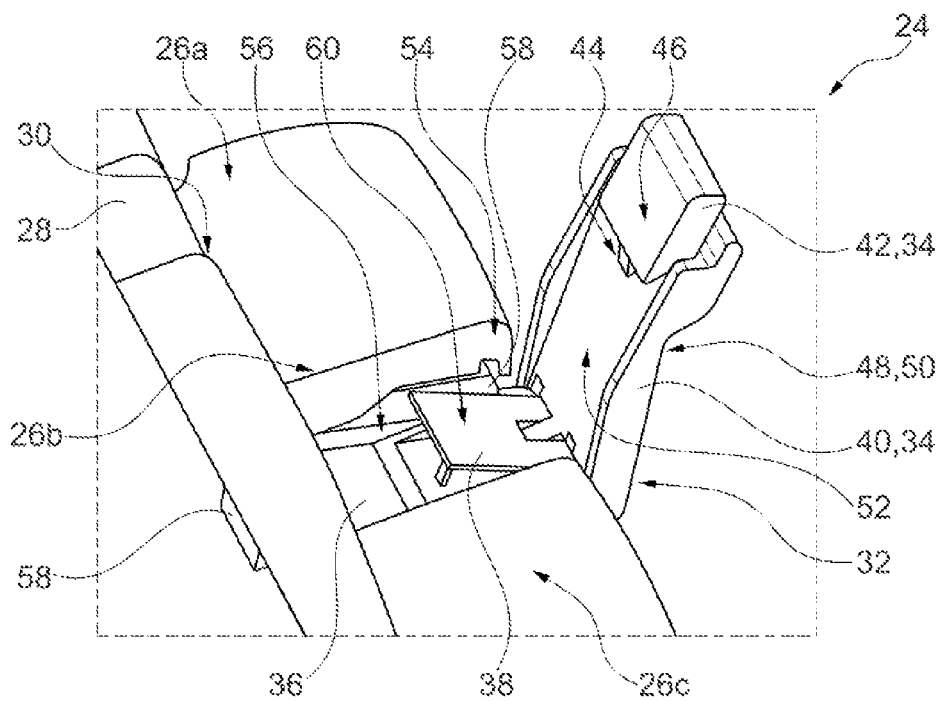
FIG. 4 shows the seat assembly of FIGS. 1 to 3 in the secondary state, FIG. 5 schematically illustrates the components of the seat assembly according to FIGS. 1 to 4 and their connections.
Figure 5:
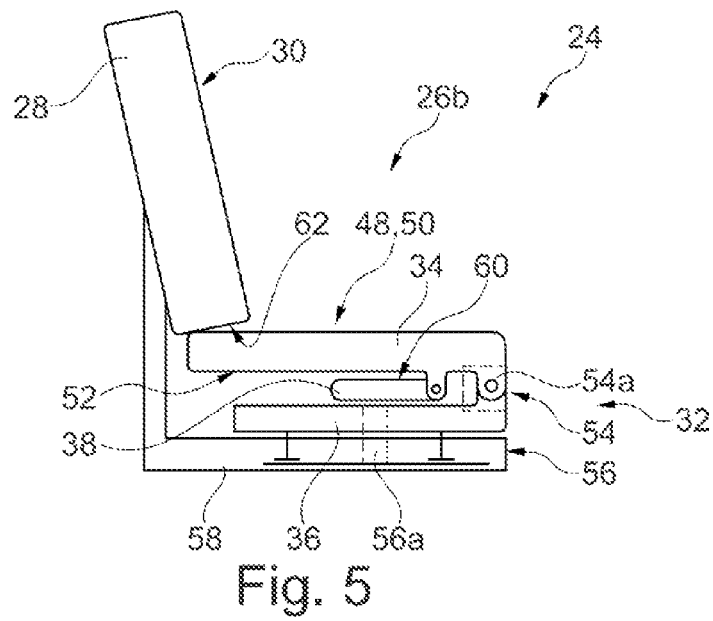

The seat assembly 24 and especially sitting zone 26b will be explained in more detail with reference to the examples shown in FIGS. 3 to 5. The seat assembly 24 includes a back rest part 28 having a primary back rest surface 30. The primary back rest surface 30 is configured to support a back of an adult sitting on the seat assembly 24. Moreover, the seat assembly 24 includes a sitting module 32. The sitting module 32 includes a first part 34, a second part 36 and a third part 38. The first part includes a first portion 40 and a second portion 42. The first portion 40 and the second portion are translationally movable with respect to one another. To this end, the first portion 40 and the second portion 42 are connected via a translation mechanism 44.

The translation mechanism 44 includes a bar-shaped first means which is connected to the second portion 42 and a corresponding channel-shaped second means which is provided on the first portion 40. The channel-shaped second means is configured to slidably receive the bar-shaped first means.

In the present example, the second portion 42 carries a secondary head rest surface 46 for supporting a head of the child sitting on the seat assembly 24.

Additionally, the first part 34, more precisely the first portion 40 of the first part 34, carries a primary functional surface 48. In the present example, the primary functional surface 48 is a primary sitting surface 50 being configured to support a bottom and a portion of the legs of an adult sitting on the seat assembly 24, if the seat assembly 24 is in the primary state.

Furthermore, the first part 34, more precisely the first portion 40 of the first part 34, carries a secondary back rest surface 52 being configured to support a back of a child sitting on the seat assembly 24, if the seat assembly 24 is in the secondary state.

The primary functional surface 48 and the secondary back rest surface 52 are arranged on opposite sides of the first part 34, more precisely on opposite sides of the first portion 40 of the first part 34.

It is noted that in other variants of the seat assembly 24, the primary functional surface 48 may alternatively be a support surface 51a for supporting objects or an arm rest surface 51b being configured to support an arm of an adult. These variants are illustrated in FIG. 2 (b) with dashed lines.

The first part 34, more precisely the first portion 40 of the first part 34 is connected to the second part 36 via a pivoting mechanism 54. More generally speaking, the pivoting mechanism is cinematically interposed between the first part 34 and a second part 36. The pivoting mechanism 54 may for example be realized using a pivoting bolt or pin being arranged in respective openings of the first part 34 and the second part 36.

The seat assembly 24 also includes a sliding mechanism 56. The sliding mechanism is cinematically interposed between the first part 34 and the back rest part 28. In the present example, the sliding mechanism 56 is arranged between the second part and a base component 58 of the seat assembly 24. The base component 58 of the seat assembly 24 may be formed by a structural component of the vehicle 12. Consequently, the second part 36 may slide with respect to the base component 58. Since the first part 34 is pivotably connected to the second part 36, also the first part 34 may slide with respect to the base component 58. Moreover, the back rest part 28 is fixedly connected to the base component 58.

A secondary sitting surface 60 is provided on the third part 38. The secondary sitting surface 60 is configured to support a bottom and a portion of the legs of the child sitting on the seat assembly 24, if the seat assembly 24 is in the secondary state. The third part 38 is pivotably supported on the first part 34. Consequently, the seat assembly 24 can assume a primary state in which the primary functional surface 48 is operational. Since in the present example, the primary functional surface 48 is a primary sitting surface 50, an adult may sit on the seat assembly 24 if it is in the primary state.

In more detail, the primary sitting surface 50 may support the bottom and a portion of the legs of the adult. Additionally, the primary back rest surface 30 may support the back of the adult.

In the primary state, the first part 34 and the third part 38 are folded onto the second part 36 such that the secondary back rest surface 52 faces the second part 36. Moreover, the secondary sitting surface 60 faces the secondary back rest surface 52. Additionally, in the primary state, an end portion of the first part 34, more precisely an end portion of the first portion 40 of the first part 34, is arranged below a lower end of the back rest part 28. On this lower end, a blocking surface 62 is arranged and the end portion of the first part 34 is arranged adjacent to the blocking surface 62. In this position, the first part 34 is blocked from pivoting with respect to the second part 36. In other words, the pivoting mechanism 54 is blocked.

Alternatively, the seat assembly 24 can assume a secondary state in which the seat assembly 24 is configured to receive a child. In the secondary state, the secondary back rest surface 52 at least partially faces the primary back rest surface 30. Moreover, the secondary sitting surface 60 generally faces upwards. This means that a normal on the secondary sitting surface 60 has a component being oriented upwards.

The seat assembly 24 may be moved from the primary state into the secondary state using a method for transferring a seat assembly for a vehicle from a primary state in which a primary functional surface of the seat assembly is operational into a secondary state in which the seat assembly is configured to receive a child. Thus, starting from the primary state, in a first step, the first part 34 and the second part 36 are translationally moved away from the back rest part 28 using the sliding mechanism 56. This has the effect that the end portion of the first part 34 is moved away from the blocking surface 62. Once this end portion is not located under the back rest part 28 anymore, the first part 34 is pivoted with respect to the second part 36 such that the primary back rest surface 30 and the secondary back rest surface 52 face each other.

The seat assembly 24 may also be moved from the secondary state into the primary state using a method for transferring a seat assembly for a vehicle from a secondary state in which the seat assembly is configured to receive a child into a primary state in which a primary functional surface of the seat assembly is operational. To this end, the third part 38 is folded up such that the secondary sitting surface 60 faces the secondary back rest surface 52.

If necessary, the second portion 42 of the first part 34 is moved as close as possible to the first portion 40 of the first part 34. Then, the first part 34 is pivoted with respect to the second part 36 such that the secondary back rest surface 52 faces the second part. Thereafter, the first part 34 and the second part 36 are translationally moved towards the back rest part 28. To this end, the sliding mechanism in 56 is used. The first part 34 and the second part 36 are slid until an end portion of the first part 34 is arranged adjacent to the blocking surface 62.

It is noted that transfers between the primary state and the secondary state and between the secondary state in the primary states may be performed manually. This means that the method as mentioned above may be performed manually.

Alternatively, at least one of the pivoting mechanism 54 and the sliding mechanism 56 may include a respective drive means 54a, 56a. Since the drive means 54a, 56a are optional they are represented in dashed lines in FIG. 5.

Moreover, it is understood that both the pivoting mechanism 54 and the sliding mechanism 56 include position holding means respectively. Consequently, the pivoting mechanism 54 and the sliding mechanism 56 can be locked in a desired position.

Figure 6:
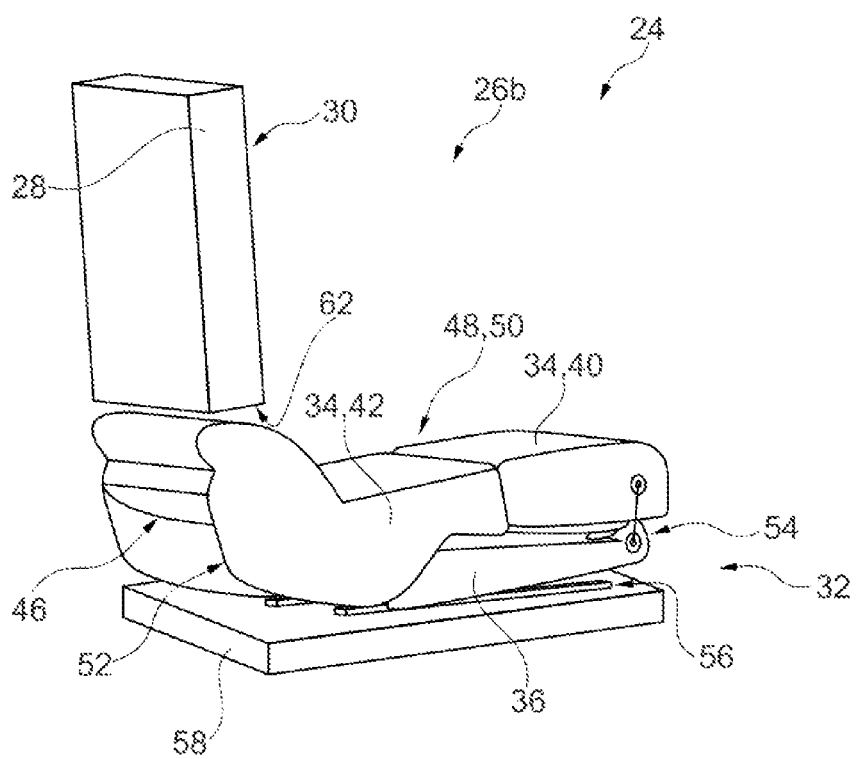
FIG. 6 shows a seat assembly according to another example of the present disclosure, wherein the seat assembly is in a primary state.
Figure 7:
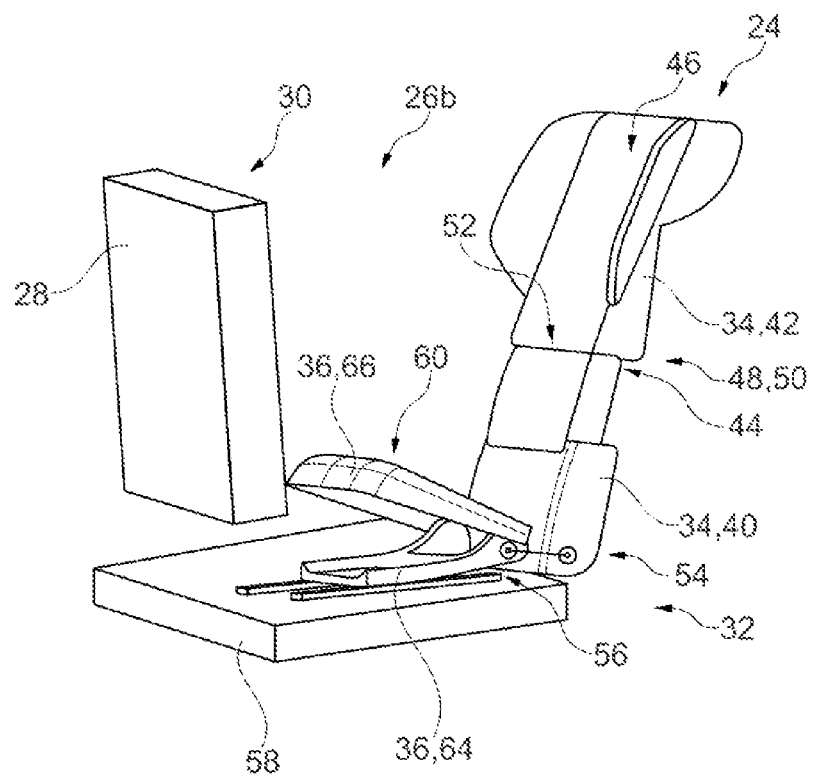
FIG. 7 shows the seat assembly of FIG. 6 in a secondary state, FIG. 8 schematically illustrates the components of the seat assembly according to FIGS. 6 and 7 and their connections.
Figure 8:
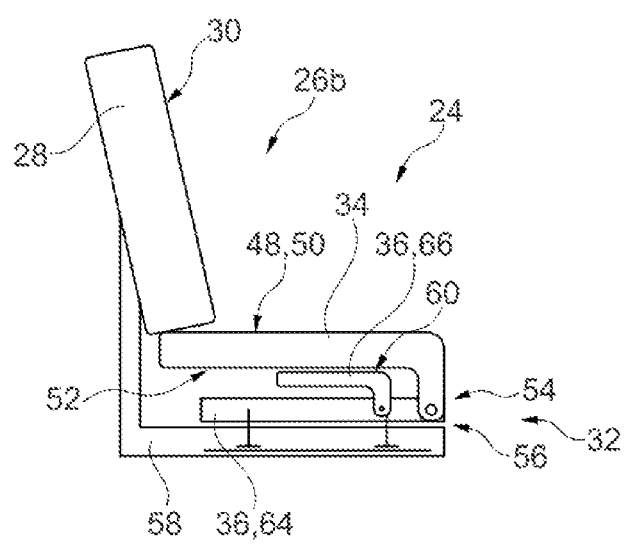

FIGS. 6 to 8 show a further example of a seat assembly 24. In the following, only the differences with respect to the examples of FIGS. 1 to 5 will be explained. Same or corresponding parts will be provided with the same reference signs.

In the example of FIGS. 6 to 8, there is no third part. Instead, the second part 36 includes a first portion 64 and a second portion 66. The first portion 64 and the second portion 66 are pivotably connected, e.g. by means of a bolt or pin. The secondary sitting surface 60 is provided on the second portion 66 of the second part 36. The first portion 64 of the second part 36 is connected to the sliding mechanism 56. Beyond that, reference is made to the above explanations.

Figure 9:
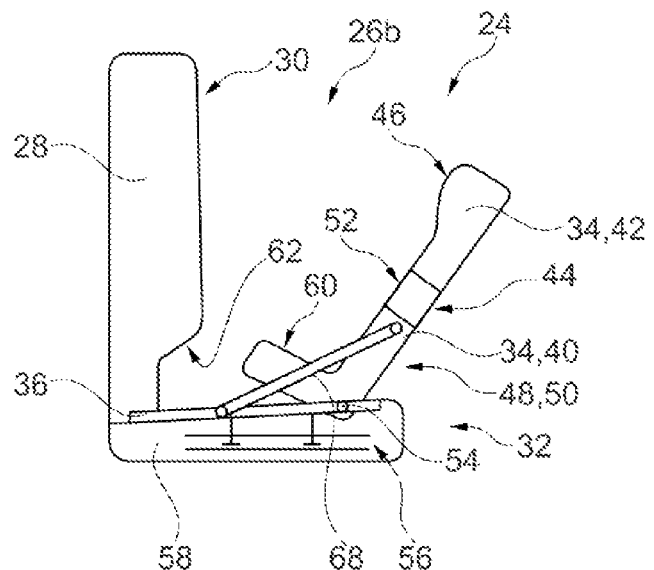
FIG. 9 shows a seat assembly according to a further example of the present disclosure, wherein the seat assembly is in a secondary state.

FIG. 9 shows a further example of the seat assembly 24. As before, only the differences with respect to the examples that have already been explained in connection with FIGS. 1 to 8 will be mentioned.

In the example of FIG. 9, the secondary sitting surface 60 is provided on the first portion 40 of the first part 34. This means that an angle between the secondary sitting surface 60 and the secondary back rest surface 52 is fixed. Furthermore, the seat assembly 24 of FIG. 9 includes a holding bar 68. The holding bar 68 connects the first part 34 and the second part 36. In this context, a first end of the holding bar 68 is pivotably connected to the first part 34. A second end of the holding bar 68 is slidably connected to the second part 36. Consequently, the holding bar 68 provides further stability to the seat assembly 24. Especially, the holding bar 68 prevents the seat assembly 24 from collapsing if it is in the secondary state and the vehicle 12 is involved in an accident. It is noted that a holding bar 68 may be provided on each side of the sitting module 32. Beyond that, reference is made to the above explanations.

Figure 10:
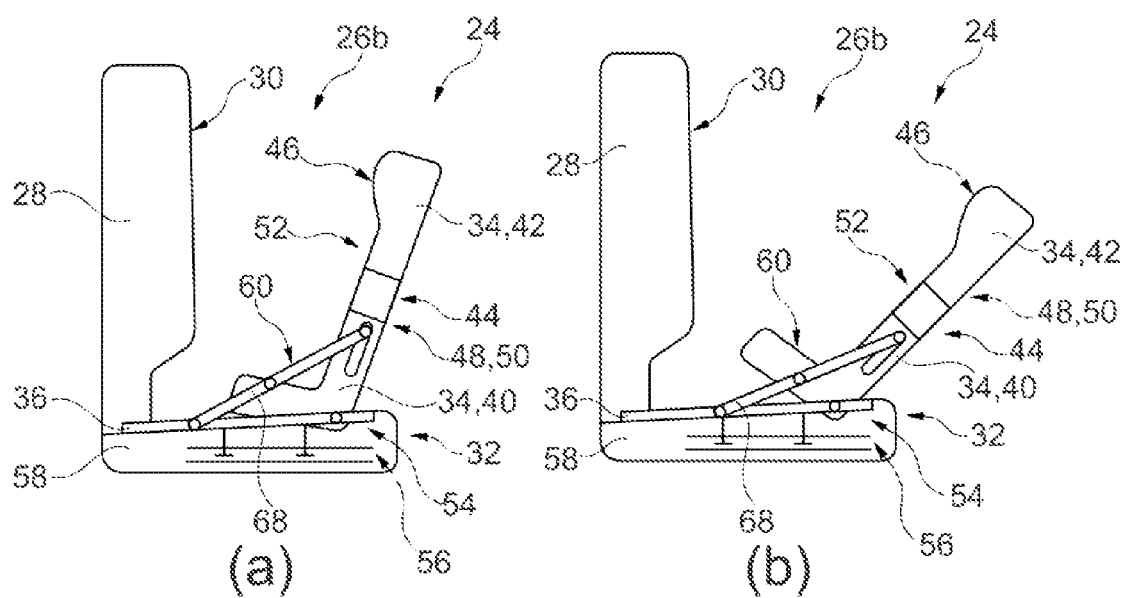
FIG. 10a shows a seat assembly according to another example of the present disclosure, wherein the seat assembly is in a secondary state, and FIG. 10b also shows the seat assembly according to another example of the present disclosure, wherein the seat assembly is in a secondary state.

Another example of the seat assembly 24 is shown in FIG. 10. This example is a variant of the example of FIG. 9. Consequently, only the differences with respect to this example will be explained.

Again, a holding bar 68 is provided. However, now the first end of the holding bar 68 is slidably connected to the first part 34 and the second end of the holding bar is slidably connected to the second part 36. Due to this configuration, an angle of the secondary back rest surface 52 may be adjusted within a comparatively big range (compare FIG. 10 (a) and 10 (b)). Again, the holding bar 68 provides increased ability to the seat assembly 24. As before, a holding bar 68 may be provided on each side of the sitting module 32.

Optionally, the holding bar 68 may include a pivot such that the holding bar 68 can be folded if the seat assembly 24 assumes the primary state.

It is noted that even though in the above examples the seat assembly 24 is a rear bench seat assembly, this is not compulsory. The seat assembly 24 may as well be a single seat or a rear bench seat assembly for two adults, i.e. with two sitting zones.

It is additionally noted that the seat assembly 24 includes a primary seatbelt arrangement which is operational if the seat assembly is in the primary state and which is configured to secure an adult. Moreover, the seat assembly 24 includes a secondary seatbelt arrangement which is operational if the seat assembly 24 is in a secondary state. The secondary seat belt arrangement is configured to secure a child. The secondary seatbelt arrangement may include a five-point seatbelt. For the ease of representation, none of the primary seatbelt assembly and the secondary seatbelt assembly is shown in the Figures.

Additionally, since in the primary state the seat assembly 24 is more compact than in the secondary state, the primary state may also be designated as a folded state, wherein the secondary state may be designated as an unfolded state.

Other variations to the disclosed examples can be understood and effected by those skilled in the art in practicing the claimed disclosure, from the study of the drawings, the disclosure, and the appended claims. In the claims the word "comprising" does not exclude other elements or steps and the indefinite article "a" or "an" does not exclude a plurality. A single processor or other unit may fulfill the functions of several items or steps recited in the claims. The mere fact that certain measures are recited in mutually different dependent claims does not indicate that a combination of these measures cannot be used to advantage. Any reference signs in the claims should not be construed as limiting the scope of the claims.

The invention claimed is:

1. A seat assembly for a vehicle, the seat assembly comprising:
 a back rest part having a primary back rest surface being configured to support a back of an adult sitting on the seat assembly; and
 a sitting module comprising a first part and a second part,
 wherein the first part carries a primary functional surface being configured to support a bottom and a portion of legs of the adult sitting on the seat assembly and a secondary back rest surface being configured to support a back of a child sitting on the seat assembly, the primary functional surface and the secondary back rest surface being arranged on opposite sides of the first part, and
 wherein the sitting module comprises a pivoting mechanism and a sliding mechanism, the pivoting mechanism being kinematically interposed between the first part and the second part and the sliding mechanism being kinematically interposed between the first part and the back rest part such that the seat assembly may selectively assume a primary state in which the primary functional surface is operational or a secondary state in which the seat assembly is configured to receive a child, the sliding mechanism being operable for arranging an end portion of the first part below a lower end of the back rest part and blocking pivoting of the pivoting mechanism in the primary state.

2. The seat assembly according to claim 1, wherein one of:

the primary functional surface is a support surface for supporting objects, and the primary functional surface is an arm rest surface being configured to support an arm of an adult.

3. The seat assembly according to claim 1, wherein one or more of:

in the primary state, the secondary back rest surface faces the second part; and in the primary state, an end portion of the first part is arranged adjacent to a blocking surface of the back rest part such that the pivoting mechanism is blocked.

4. The seat assembly according to claim 1, wherein in the secondary state, the secondary back rest surface at least partially faces the primary back rest surface.

5. The seat assembly according to claim 1, wherein a secondary sitting surface being configured to support a bottom and a portion of the legs of the child sitting on the seat assembly is located on the second part.

6. The seat assembly according to claim 5, wherein the second part comprises a first portion and a second portion, wherein one of the first portion and the second portion carries the secondary sitting surface and the first portion and the second portion are pivotably connected.

7. The seat assembly according to claim 1, wherein a secondary sitting surface being configured to support a bottom and a portion of the legs of the child sitting on the seat assembly is located on a third part, the third part being pivotably supported on the first part.

8. The seat assembly according to claim 1, wherein the first part comprises a first portion and a second portion, the first portion and the second portion being translationally movable with respect to one another.

9. The seat assembly according to claim 8, wherein one of the first portion and the second portion is kinematically connected to the second part via the pivoting mechanism and another of the first portion and the second portion carries a secondary head rest surface for supporting a head of the child sitting on the seat assembly.

10. The seat assembly according to claim 1, wherein the seat assembly is a rear bench seat assembly with three sitting zones being arranged side by side along a width direction (W) of the rear bench seat assembly, wherein each of the three sitting zones is configured to receive an adult sitting on the rear bench assembly, and wherein the sitting module and the primary sitting surface are associated with one of the sitting zones being arranged between the two remaining sitting zones.

11. The seat assembly according to claim 1, wherein at least one of the pivoting mechanism and the sliding mechanism comprises a respective drive means.

12. The seat assembly according to claim 1, wherein at least one of the pivoting mechanism and the sliding mechanism comprises a position holding means being configured to lock the pivoting mechanism or the sliding mechanism in a desired position.

13. A vehicle comprising a driver front seat, a passenger front seat, and the seat assembly according to claim 1, wherein a gap is provided between the driver front seat and the passenger front seat, and wherein the first part of the seat assembly at least partially extends into the gap if the seat assembly is in the secondary state or wherein a width of the gap is larger than a width of the first part and the first part is arranged adjacent to the gap when the seat assembly is in the secondary state.

14. A method for transferring a seat assembly for a vehicle from a primary state in which a primary functional surface of the seat assembly is operational, into a secondary state in which the seat assembly is configured to receive a child, wherein the seat assembly comprises a back rest part having a primary back rest surface being configured to support a back of an adult sitting on the seat assembly and a sitting module comprising a first part and a second part, and wherein the first part carries the primary functional surface being configured to support a bottom and a portion of legs of the adult sitting on the seat assembly and a secondary back rest surface being configured to support a back of a child sitting on the seat assembly, the primary functional surface and the secondary back rest surface being arranged on opposite sides of the first part, the method comprising:

translationally moving at least the first part away from the back rest part to remove an end portion of the first part from below a lower end of the back rest part to allow pivoting of the first part with respect to the second part; and pivoting the first part with respect to the second part such that the primary back rest surface and the secondary back rest surface face each other.

15. A method for transferring a seat assembly for a vehicle from a secondary state in which the seat assembly is configured to receive a child, into a primary state in which a primary functional surface of the seat assembly is operational, wherein the seat assembly comprises a back rest part having a primary back rest surface being configured to support a back of an adult sitting on the seat assembly and a sitting module comprising a first part and a second part, and wherein the first part carries the primary functional surface being configured to support a bottom and a portion of legs of the adult sitting on the seat assembly and a secondary back rest surface being configured to support a back of a child sitting on the seat assembly, the primary functional surface and the secondary back rest surface being arranged on opposite sides of the first part, the method comprising:

pivoting the first part with respect to the second part such that the secondary back rest surface faces the second part; and translationally moving at least the first part towards the back rest part to arrange an end portion of the first part below a lower end of the back rest part to block pivoting of the first part with respect to the second part.

* * * * *